No. 783,289. PATENTED FEB. 21, 1905.
E. LAPISSE.
PROTECTOR FOR PNEUMATIC TIRES.
APPLICATION FILED NOV. 10, 1904.
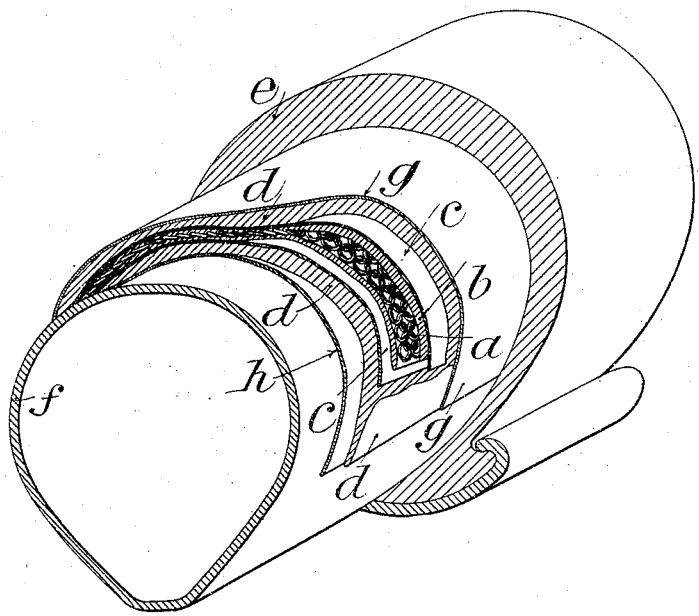
WITNESSES:
W. M. Avery
A. E. Fay.
INVENTOR
Emile Lapisse
BY Munn & Co
ATTORNEYS No. 783,289.
Patented February 21, 1905.

UNITED STATES PATENT OFFICE.

EMILE LAPISSE, OF ELBEUF, FRANCE.

PROTECTOR FOR PNEUMATIC TIRES.

SPECIFICATION forming part of Letters Patent No. 783,289, dated February 21, 1905.

Application filed November 10, 1904. Serial No. 232,092.

*To all whom it may concern:*

Be it known that I, EMILE LAPISSE, manufacturer, a citizen of the Republic of France, residing at 9 Rue de la Barrière, Elbeuf, Seine Inférieure, in the Republic of France, have invented certain new and useful Improvements in Protectors for Pneumatic Tires, of which the following is a specification.

This invention relates to a protector for pneumatic tires intended to be located between the covering and the air-chamber and to be independent of these two parts.

The said protector comprises, essentially, a strip of soft and elastic material, such as rubber, in which are incorporated strips of heat-insulating material and between the latter a strip made up of metal pieces or chain mail and of an elastic material covering the said rings and filling the interstices of the latter.

The accompanying drawing shows, by way of example, in transversal section and in perspective view one form in which the present invention may be carried out.

In the drawing, $a$ designates metal rings linked one to another, as in a coat of mail, and embedded in a thin layer $b$ of elastic material, such as rubber or the like. The said material $b$ is preferably so chosen that it will neither be disaggregated nor decomposed nor injured by the heat which may be developed within the protector when the pneumatic tire in which it is located is running on the ground. On both sides of the layer $b$ are located heat-insulating strips $c$, made, for instance, of asbestos-cloth, intended to localize the heat resulting from the repeated motions of flection of the layer $b$ and of the rings $a$ when the tire is running on the ground.

The parts $a$ $b$ $c$ are embedded in a strip $d$ of soft and elastic material, such as rubber, the edges of which are beveled. When detached and loose, the strip $d$, with the pads within the same, is in the shape of a crescent in cross-section in order to cause it to remain stable between the covering $e$ and the air-chamber of the pneumatic tires.

$g$ and $h$ designate cloth coverings made, for instance, of fabric with rubber wrought in, intended to avoid the direct contact of the strip $d$ with the covering and the air-chamber, and consequently to reduce overheating and wear due to the relative motions of the parts when running.

On account of the use of the insulating-strips $c$ the material of the strip $d$ is preserved from a rise in the temperature which may take place in the layer $b$ and the rings $a$, so that there is no fear of its being injured by the heat. Independently of this essential advantage the hereinbefore-described protector offers several other advantages, such as the following: Being free from any fixing means, it can be readily inserted into and taken out of the pneumatic tire. It is completely safe against bursting, the point or other hard body which passes through the covering meeting with the protector, and as the latter is quite independent of the covering it can give way in allowing the air-chamber to do the same in thus preventing its rupture. It also prevents any injury being done to the air-chamber. On the other hand, as the protector is not extensible it prevents the formation of hernia on the air-chamber. The protector itself cannot be a cause of injury either for the covering or the air-chamber, because the rings $a$, round or rounded off, are neither liable to break nor to perforate the adjacent parts.

As the rings are embedded in the elastic layer $b$, the effect is that they are prevented from sliding and from wearing each other away by frictional motion and likewise from rusting and from being worn by the outer parts, and, indeed, as the protector gives way before pointed bodies passing through the covering there is hardly any risk of its outer part being pierced. In case even the rings should become bare on a part of the length of the protector it would be easy to turn the latter with respect to the covering, so that the injured parts of the covering and of the protector would no longer coincide. The damaged protector is, moreover, easily repaired.

The rings may be of any shape or size and may be made of any suitable metal.

In the form described the strips $c$ of insulating material are applied directly onto the layer $b$, in which the rings $a$ are embedded or incorporated. However, there may be disposed between the layer $b$ and the strips $c$ distinct layers of elastic material of greater or less thickness.

The relative widths of the several component parts of the protector may vary as well as their thickness.

I claim—

1. A protector for pneumatic tires, comprising a strip of soft and elastic material, strips of heat-insulating material incorporated in the said strip, and a strip composed of metal rings linked together like a coat of mail, and a layer of elastic material covering the said rings and filling the interstices of the same, the said composite strip being located between the insulating-strips.

2. A protector for pneumatic tires comprising a layer of elastic material, metal rings linked together like a coat of mail and incorporated in the said layer, and insulating-strips on both sides of the said layer.

3. A protector for pneumatic tires, comprising the combination of metal rings linked together like a coat of mail, a layer of elastic material covering the said rings, and strips of insulating material on both sides of the said layer, with a strip of rubber in which the previous parts are incorporated, and cloth coverings on the said strip.

4. A protector for tires, comprising a layer of metallic pieces movably connected together, a layer of elastic material on each side thereof, and a layer of asbestos on the outside of each layer of elastic material.

5. A crescent-shaped protector for tires, comprising a layer of metallic pieces connected together, a layer of elastic material on each side thereof, a layer of asbestos on the outside of each of the elastic layers, and a layer of elastic material on the outside of each layer of asbestos.

In testimony that I claim the foregoing as my invention I have signed my name in presence of two subscribing witnesses.

EMILE LAPISSE.

Witnesses:
ARCHIBALD R. BAKER,
MAURICE ROUX.